(12) United States Patent
Willner

(10) Patent No.: US 8,858,656 B2
(45) Date of Patent: Oct. 14, 2014

(54) METHOD FOR THERMALLY CLEAVING ORGANIC WASTE HAVING HIGH MOLECULAR WEIGHT

(75) Inventor: Thomas Willner, Hamburg (DE)

(73) Assignee: Nexxoil AG, Zurich (CH)

( * ) Notice: Subject to any disclaimer, the term of this patent is extended or adjusted under 35 U.S.C. 154(b) by 0 days.

(21) Appl. No.: 13/640,800

(22) PCT Filed: Mar. 3, 2011

(86) PCT No.: PCT/DE2011/000220
§ 371 (c)(1),
(2), (4) Date: Dec. 20, 2012

(87) PCT Pub. No.: WO2011/127881
PCT Pub. Date: Oct. 20, 2011

(65) Prior Publication Data
US 2013/0091761 A1    Apr. 18, 2013

(30) Foreign Application Priority Data

Apr. 13, 2010 (DE) .......................... 10 2010 014 768

(51) Int. Cl.
| | |
|---|---|
| C10L 1/02 | (2006.01) |
| C10B 53/07 | (2006.01) |
| C10G 9/00 | (2006.01) |
| C10G 1/10 | (2006.01) |
| C10B 57/04 | (2006.01) |
| C10B 53/06 | (2006.01) |
| C10B 53/02 | (2006.01) |
| C10G 1/00 | (2006.01) |

(52) U.S. Cl.
CPC .. *C10L 1/02* (2013.01); *Y02E 50/14* (2013.01); *C10G 2300/1018* (2013.01); *C10B 53/07* (2013.01); *C10G 9/00* (2013.01); *C10G 2300/1014* (2013.01); *C10G 2300/1003* (2013.01); *Y02E 50/32* (2013.01); *C10G 1/10* (2013.01); *C10B 57/04* (2013.01); *Y02E 50/13* (2013.01); *C10G 2300/4006* (2013.01); *C10B 53/06* (2013.01); *C10B 53/02* (2013.01); *C10G 1/00* (2013.01)
USPC .......................................................... 44/307

(58) Field of Classification Search
CPC ........................................................ C10L 1/02
USPC ............................. 44/307; 585/240, 241, 242
See application file for complete search history.

(56) References Cited

U.S. PATENT DOCUMENTS

| | | | | |
|---|---|---|---|---|
| 7,704,381 B2 | | 4/2010 | Siekmann | |
| 2007/0098625 A1* | | 5/2007 | Adams et al. | 423/484 |
| 2013/0023706 A1* | | 1/2013 | Huber et al. | 585/241 |

FOREIGN PATENT DOCUMENTS

| | | | |
|---|---|---|---|
| CN | 101508619 A | | 8/2009 |
| CN | 101508619 A | * | 8/2009 |

OTHER PUBLICATIONS

CN101508619A—Bib; Cui et al.; China, Aug. 2009.*
(Continued)

*Primary Examiner* — Pamela H Weiss
*Assistant Examiner* — Chantel Graham
(74) *Attorney, Agent, or Firm* — Millen, White, Zelano & Branigan, P.C.

(57) ABSTRACT

The invention relates to a method for thermochemically converting organic waste material having high molecular weight into liquid combustible materials and fuels, comprising the following steps: feeding organic waste material into a reactor, heating the organic waste material to a temperature between 250° C. and 500° C. while avoiding exceeding critical coking temperatures in the reactor, feeding biogenic substances to the reactor, collecting and condensing the gases and vapors released from the mixture of organic waste material and biogenic substances, collecting the condensate and letting phases form, and removing the phase(s) containing liquid combustible materials and fuels.

21 Claims, 3 Drawing Sheets

(56) References Cited

OTHER PUBLICATIONS

CN101508619A—Description; Cui et al.; China, Aug. 2009.*
Abstract of CN 101508619 A, "Method for Preparing Hydrocarbon with Catalysis Copyrolysis of Biomass and Polymer," Univ. Zhejiang, Filed Mar. 12, 2009, Published Aug. 19, 2009, 1 page.
Darmstadt, H., et al., "Co-pyrolysis under vacuum of sugar cane bagasse and petroleum residue Properties of the char and activated char products," Carbon 39 (2001) (Received Feb. 14, 2000; accepted Jun. 7, 2000), pp. 815-825.

Matsuzawa, Y., et al., "Acceleration of cellulose co-pyrolysis with polymer," Polymer Degradation and Stability 71 (2001) (Received Jun. 29, 2000; accepted Oct. 7, 2000), pp. 435-444.
Sharypov, V.I., et al., "Co-pyrolysis of wood biomass and synthetic polymer mixtures. Part I: influence of experimental conditions on the evolution of solids, liquids and gases," Journal of Analytical and Applied Pyrolysis 64 (2002) (Received Mar. 20, 2001; accepted Jun. 21, 2001), pp. 15-28.

* cited by examiner

| Nr. | Retention time in min | Component | Molecular formula |
|---|---|---|---|
| 1 | 6.34 | Heptane | $C_7H_{16}$ |
| 2 | 9.42 | Octane | $C_8H_{18}$ |
| 3 | 13.93 | Nonane | $C_9H_{20}$ |
| 4 | 19.12 | Decane | $C_{10}H_{22}$ |
| 5 | 24.35 | Undecane | $C_{11}H_{24}$ |
| 6 | 29.40 | Dodecane | $C_{12}H_{26}$ |
| 7 | 34.17 | Tridecane | $C_{13}H_{28}$ |
| 8 | 38.68 | Tetradecane | $C_{14}H_{30}$ |
| 9 | 42.94 | Pentadecane | $C_{15}H_{32}$ |
| 10 | 46.98 | Hexadecane | $C_{16}H_{34}$ |
| 11 | 50,81 | Heptadecane | $C_{17}H_{36}$ |
| 12 | 54.45 | Octadecane | $C_{18}H_{38}$ |
| 13 | 57.91 | Nonadecane | $C_{19}H_{40}$ |
| 14 | 61.23 | Icosane | $C_{20}H_{42}$ |
| 15 | 64.39 | Heneicosane | $C_{21}H_{44}$ |
| 16 | 67.43 | Docosane | $C_{22}H_{46}$ |
| 17 | 70.05 | Internal standard fluoranthene | |
| 18 | 70.33 | Tricosane | $C_{23}H_{48}$ |
| 19 | 73.13 | Tetracosane | $C_{24}H_{50}$ |
| 20 | 75.82 | Pentacosane | $C_{25}H_{52}$ |
| 21 | 78.40 | Hexacosane | $C_{26}H_{54}$ |
| 22 | 80.90 | Heptacosane | $C_{27}H_{56}$ |
| 23 | 83.34 | Octacosane | $C_{28}H_{58}$ |

FIG. 2B

METHOD FOR THERMALLY CLEAVING ORGANIC WASTE HAVING HIGH MOLECULAR WEIGHT

The invention relates to a method for thermochemically converting organic waste material having high molecular weight into liquid combustible materials and fuels.

Organic waste materials having high molecular weight are solid hydrocarbon-containing substances or substance mixtures, consisting of long-chain or cross-linked molecules. Such waste materials may e.g. be plastic or rubber wastes, distillation residues from mineral oil processing, heavy oils of all kinds, asphalts, bitumen, tar sands or oil shale.

The conventional method for catalytically cracking hydrocarbons having high molecular weight in mineral oil processing is the so-called FCC method (Fluid Catalytic Cracking). Therein, the reaction is carried out with a circulating gas fluidized bed. The swirled-up catalyst moves back and forth between the crack reactor operated at approx. 500° C. and the regenerator operated at approx. 700° C. In the FCC method, the educt needs to be completely vaporized in the reactor, before the crack reactions at the swirled-up catalyst particles can occur. For not easily vaporizable solid matter having high molecular weight such as e.g. plastics, tar sands or oil shale, this is not possible.

If the cracking reactions are carried out at low temperatures below 500° C., the initial substances having high molecular weight are not completely vaporized anymore, so that they are predominantly in a liquid phase. However, because of the lower temperatures, very active catalysts mused be used for increasing the reaction speed. A decisive problem when using cracking catalysts such as zeolites in liquid phase reactions is however that they very quickly lose their activity, in particular because of carbonization reactions. This leads to high operating costs.

DE 102 15 679 B4 describes the thermal conversion of substances having high molecular weight into liquid fuels, wherein the cracking reactions proceed in a heavy oil liquid phase in a temperature range between 350 and 500° C. By using a gas flow having hydrogenating or reducing properties, the autocatalytic effect of the heavy oil fraction is utilized. Using hydrogenating or reducing gases requires however increased operating pressures of usually more than 5 MPa. Further, it has to be noted, when using DE 102 15 679 B4, that the reaction temperatures need to be sufficiently low, in order that the containers, pipelines, and heating elements do not coke. Critical coking temperatures have to be expected above 400 to 450° C., depending on the substance. In order to avoid coking, the reaction temperatures, in particular at heated walls, must be below the respective critical coking temperatures. For temperature-stable hydrocarbons such as plastic and rubber wastes, distillation residues from mineral oil processing, tar sands or oil shale, higher reaction temperatures are necessary according to the method of DE 102 15 679 B4, so that for these hydrocarbons, coking reactions will strongly impair the technical implementation. Another drawback of DE 102 15 679 B4 is the necessity to heat the raw material very quickly. Hence, excessive wall temperatures leading to coking are there usually inevitable.

The necessity of excessive reaction temperatures for the mentioned hydrocarbons to a particular degree also applies to pyrolysis methods, i.e. purely thermal decompositions, so that there, too, undesired coking reactions represent a substantial problem for the process.

In DE 19742266 A1, a method is described wherein plastics together with biomass can be converted into crude oils: In this method, water is used as an auxiliary agent (hydrolytic cleavage). Therefore, in this particular process, very high pressures of approx. 20 MPa are necessary.

There is therefore a need of a method for cleaving the mentioned hydrocarbons that takes place at atmospheric pressure, does not need any addition of catalysts, and can be carried out at reaction temperatures below critical coking temperatures, wherein organic waste material having high molecular weight, also including the non-evaporative components, can be converted into liquid combustible materials and fuels.

This object is achieved by the method described in the claims. The sub-claims represent advantageous embodiments of the invention.

The method according to the invention comprises the following steps:
heating the organic waste material having high molecular weight to temperatures between 250° C. and 500° C., preferably between 280° C. and 420° C., particularly preferably between 300° C. and 400° C., while avoiding exceeding critical coking temperatures in a reactor or alternatively in a preheater with subsequent transfer into a reactor,
adding biogenic substances,
cooling the released gas-vapor phase, condensing the vapor fractions and collecting the generated condensate phases,
depositing and separating the generated phases.

It is not necessary to carry out the individual steps of the method according to the invention one after the other. These steps may proceed in a different order or, in particular with a continuous mode of operation, simultaneously.

The organic waste material having high molecular weight and the biogenic substances have to be fed in small pieces. Alternatively, the waste material, if it is fusible, can be processed in a fused condition. It has proven advantageous to stir during the conversion or to keep the material moving in a different way.

Other measures are for instance inert fluidization gases, if the materials in the reactor are a solid mixture, or circuit pumps, if the waste material in the reactor is in a fused flowable condition.

Surprisingly, it has been found that organic waste material having high molecular weight, also including the non-evaporative components, can be converted at atmospheric pressure without addition of catalysts at temperatures up to 500° C., but below the coking temperatures, i.e. in most cases below 400° C., into liquid combustible materials and fuels, if biogenic substances are added. Often, unexpectedly low reaction temperatures below 350° C. have even been found, at which most organic waste materials having high molecular weights would not decompose at all without adding biogenic material.

Biogenic substances are substances, the origin of which is biological. These may for instance be all materials containing hydrocarbons such as cellulose, starch and sugar, for instance straw, miscanthus, corn, green waste, wood etc., also contaminated wood, and all materials containing proteins, for instance dried sewage sludge, harbor slick, meat and bone meal etc. Altogether, in principle nearly all plant and animal materials and processed products thereof such as paper, carton, food residues or leather are thus suitable. Surprisingly, the biogenic substances may even be contaminated for instance by heavy metals, sulfur or halogens.

Surprisingly, it has been found that the condensed hydrocarbon liquid product oils to be used as liquid combustible materials and fuels are virtually free from disturbing biogenic decomposition products. In the case of contaminations, as described above, the product oils surprisingly remain free or nearly free from these contaminations.

Organic waste materials having high molecular weight may be substances containing long-chain and/or branched hydrocarbon molecules, such as for instance plastic or rubber wastes, distillation residues from mineral oil processing, heavy oils of all kinds, asphalts, bitumen, tar sands or oil shale.

BRIEF DESCRIPTION OF THE DRAWINGS

Further and examples of the present invention shall be explained by the following descriptions of the Figures, wherein:

FIG. 2B shows an evaluation table of the signals shown in the GC-MS analysis of FIG. 2A.

Figure 1:
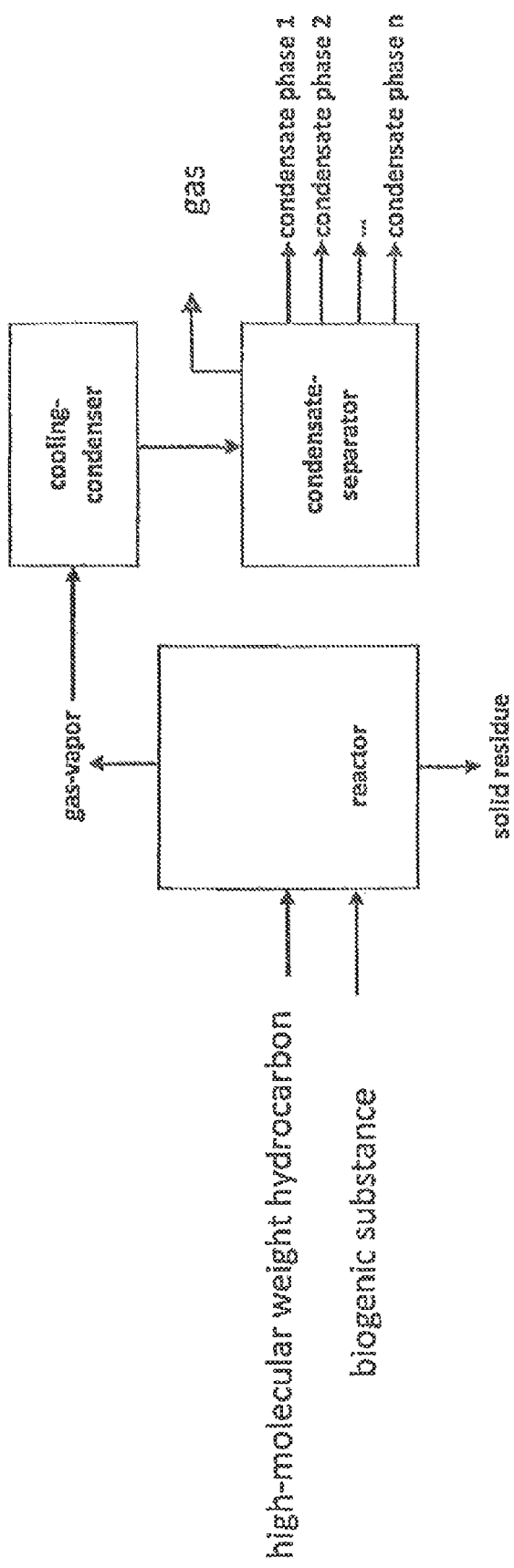
FIG. 1 illustrates a flow diagram of an embodiment of the method according to the invention is explained in more detail by the in FIG. 1.

The method according to the invention is explained in more detail by the flow diagram in FIG. 1.

The organic waste material having high molecular weight is brought to temperatures from 250° C. to 500° C., preferably temperatures between 280° C. and 420° C., particularly preferably between 300° C. and 400° C. This may take place in a reactor or in a preheater with subsequent transfer into a reactor. For this purpose, heating systems of various kinds may be used, such as electrical heating—for instance by resistance, induction or high-frequency, burner exhaust gas systems or many others.

After adding biogenic substances, according to the invention, the organic waste substances having high molecular weight start cleaving into shorter-chain liquid fuels in the light and middle oil range.

These vaporize in the reactor and are guided through the gas-vapor phase at the top out of the reactor, and their vapor fractions are then liquefied again by cooling and condensing.

Different from expected, the obtained condensed hydrocarbon liquid product oils remain virtually free from disturbing biogenic decomposition products.

The biogenic substances themselves pass through pyrolytic decomposition reactions. The biogenic pyrolysis products generated thereby during the reaction are normally firstly a solid residue directly leaving the reactor and not getting into the gas-vapor phase, secondly escaping gases that do not condense, and thirdly biogenic condensate phases. Corresponding considerations apply to the above-mentioned contaminations of the biogenic substances.

Thus, several immiscible condensate phases are generated that arrange themselves in the condensate separately on top of each other according to their densities, and can thus mechanically be separated from each other in a simple way. This simple separation of the product phases is particularly advantageous.

A particular advantage of the method according to the invention is the fact that even not fully vaporizable organic remnants having high molecular weight and being solid at room temperature can be processed.

The special features of the method according to the invention are:

The method proceeds at atmospheric pressure.
In the method, a temperature of 400° C. is normally not exceeded.
Catalysts are not required.
Further auxiliary substances for the reaction, such as water or gases, are not required.
The generated product condensate phases can be mechanically separated from each other in a simple way.
The method according to the invention can be carried out as a batch operation or continuously.

In the following, the invention is explained in more detail with the aid of the following example.

8 kg of a vacuum distillation residue from mineral oil processing that is solid at room temperature are provided in a laboratory stir reactor as hydrocarbon having high molecular weight.

By means of electrical jacket heating at the reactor, this substance is heated to 390° C. Then, dried and chopped straw is continuously added as biogenic substance by means of a conveying screw to the reactor while stirring all the time. During the straw addition, the generation and release of vaporizing cleavage products through the gas-vapor phase is observed, these cleavage products being continuously discharged at the top out of the reactor and conducted through a cooling condenser.

The condensate is continuously collected in a separatory funnel.

The non-condensing gas phase is discharged through an offtake. In the separatory funnel, four immiscible liquid phases arranged on top of each other are collected. Arranged by increasing density from top to bottom, these are firstly a dark-brown oil phase (condensate phase 1), secondly a black-brown organic phase (condensate phase 2), thirdly a red-brown aqueous phase (condensate phase 3), and fourthly a black-brown organic phase (condensate phase 4).

Added together, 2 kg straw were added over 2 hours. At the end of the test, 4.21 kg residue were taken from the reactor. An extractive analysis shows that this residue consists of 0.72 kg carbonization residue and 3.49 kg heavy oil residue. In the condensate were collected 4.14 kg phase 1, 0.24 kg phase 2, 0.58 kg phase 3 and 0.09 kg phase 4. 0.74 kg gas balance difference was determined. This non-condensing gas consists, as a gas analysis shows, approx. in one half of oxygen-containing cleavage products such as carbon dioxide and carbon monoxide and in the other half of hydrocarbon cleavage products such as methane, ethane, propane and butane. The olefins thereof, ethylene, propylene, and butylene were also found.

Figure 2A:
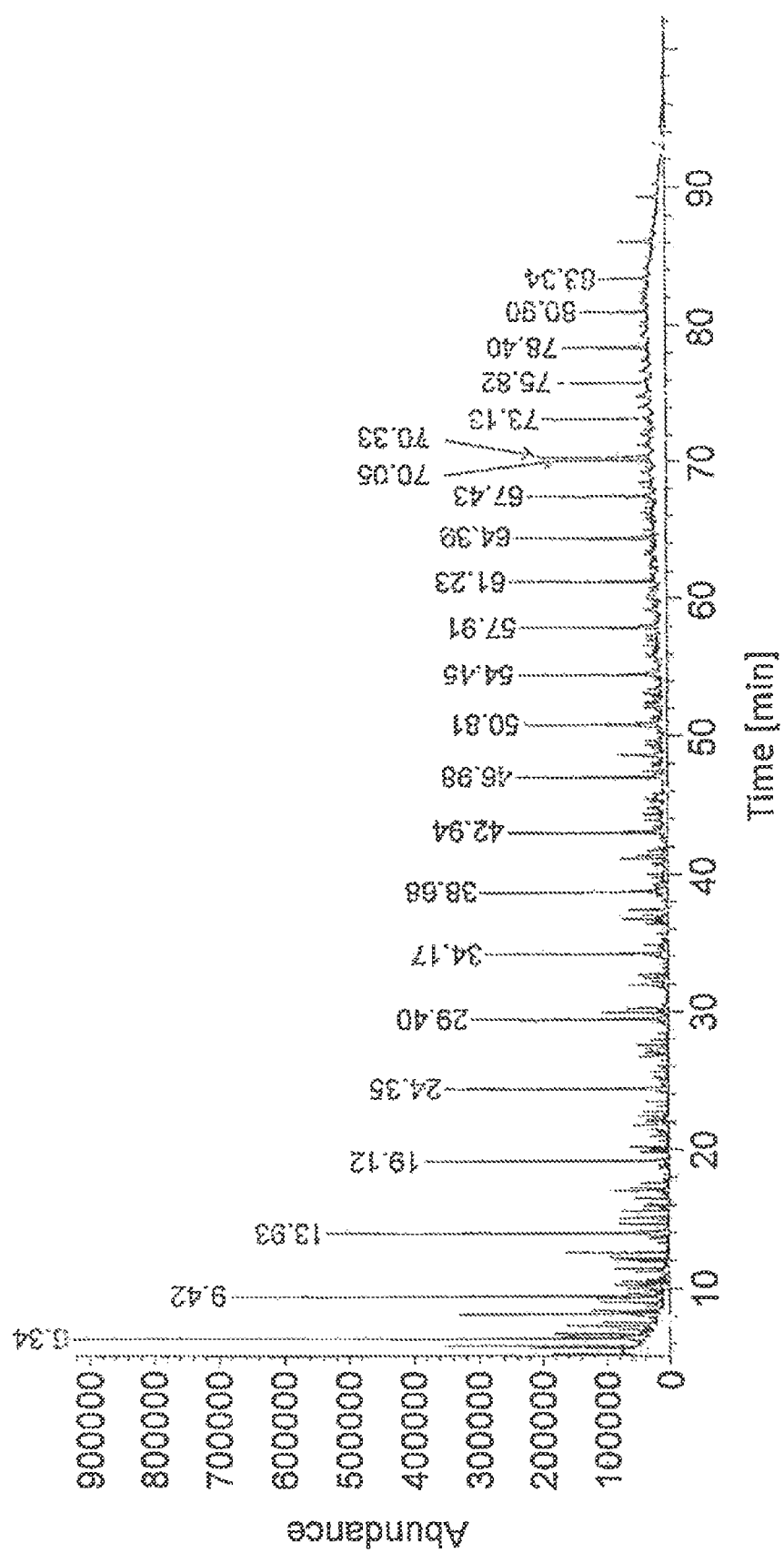
FIG. 2A shows a GC-MS analysis of condensate phase 1 of a product oil according to the invention.

In FIG. 2A, a GC-MS analysis of the condensate phase 1 of the product oil according to the invention is presented, and an evaluation table of the signals is shown in FIG. 2B. It can be seen that predominantly saturated unbranched alkanes have been generated, and immediately next to every alkane peak respectively the associated, in most cases smaller olefin peak can be seen. Disturbing biogenic cleavage products such as phenol derivatives can virtually not be found.

For the GC-MS analysis, a device of the company Agilent, Type HP5972A is used, the separation column coated with cyanpropylphenol and polysiloxane, Type ZB1701 is from the company Zebron. The heating rate is (3° C./min). The temperature program covers the range from 45° C. to 280° C. The internal standard was fluoranthene (retention time 70.05 min).

In order to demonstrate the freeness from biogenic remnants in the hydrocarbon product oil (phase 1), a C14 isotope analysis was carried out. This resulted in a biogenic C share in the product oil of less than 5%.

The aqueous phase (condensate phase 3) contains, besides water, acetic acid as the main component. Further, other water-soluble oxygen-containing organic components such as formic acid, aldehydes, ketones, alcohols and acetates can be found therein.

The two other organic condensate phases, phase 2 and phase 4, predominantly consist of oxygen-containing ring compounds such as phenol derivatives. Purely paraffinic hydrocarbons such as n-alkanes cannot be found there.

The invention claimed is:

1. A method for thermochemically converting organic waste material having high molecular weight into liquid combustible materials and fuels, said method comprising:
feeding organic waste material into a reactor and heating the organic waste material to a temperature between 250° C. and 500° C., while avoiding exceeding critical coking temperatures in the reactor, or
preheating organic waste material to a temperature between 250° C. and 500° C., while avoiding exceeding critical coking temperatures in the reactor, and then feeding the organic waste material into a reactor and avoiding exceeding critical coking temperatures in the reactor,
wherein the organic waste material in the reactor is in a flowable condition,
thereafter feeding biogenic substances to the reactor to form a mixture of organic waste material and biogenic substances,
thermochemically converting the mixture of organic waste material and biogenic substances in said reactor,
collecting and condensing gases and vapors released from the mixture of organic waste material and biogenic substances, as a result of the thermochemical conversion in said reactor, to form a condensate,
collecting said condensate and letting one or more phases form from said condensate, wherein said one or more phases include one or more phases containing liquid combustible materials and fuels, and
removing a phase or phases containing liquid combustible materials and fuels.

2. The method according to claim 1, wherein the organic waste material consists of long-chain and/or branched hydrocarbon molecules.

3. The method according to claim 1, wherein the organic waste material is plastic waste, rubber waste, heavy oils, asphalts, bitumen, tar sands, distillation residues from mineral oil processing, and/or oil shale.

4. The method according to claim 1, wherein the biogenic material is of plant origin.

5. The method according to claim 1, wherein the biogenic material is cellulose, starch, sugar, straw, miscanthus, corn, green waste, wood, proteins, sewage sludge, harbor slick, meat meal, bone meal, paper, carton, food residues and/or leather.

6. The method according to claim 1, wherein the organic waste material is preheated to 250° C. to 500° C. before being fed into said reactor.

7. The method according to claim 1, wherein the method is carried out at atmospheric pressure.

8. The method according to claim 1, wherein the temperature in the reactor is between 280° C. and 420° C.

9. The method according to claim 1, wherein the temperature in the reactor is between 300° C. and 400° C.

10. The method according to claim 1, wherein the weight ratio of organic waste material to biogenic substances is 4:1.

11. The method according to claim 1, wherein the biogenic material is of animal origin.

12. The method according to claim 1, wherein the biogenic material is of plant and animal origin.

13. The method according to claim 6, wherein the organic waste material is preheated to 280° C. to 420° C. before being fed into said reactor.

14. The method according to claim 6, wherein the organic waste material is preheated to 300° C. to 400° C. before being fed into said reactor.

15. The method according to claim 1, wherein the thermochemical conversion of the mixture of organic waste material and biogenic substances is performed without catalysts.

16. The method according to claim 1, wherein the method is performed continuously.

17. The method according to claim 1, wherein said reactor is a stirred reactor and the thermochemical conversion of the mixture of organic waste material and biogenic substances is performed in said stirred reactor.

18. The method according to claim 1, wherein a plurality of phases are formed from said condensate and said removing of the phase or phases containing liquid combustible materials and fuels is performed by mechanical separation.

19. The method according to claim 1, wherein a plurality of phases are formed from said condensate, and said plurality of phases are immiscible condensate phases that can be mechanically separated from each other.

20. The method according to claim 1, wherein the organic waste material comprises heavy oils, asphalts, bitumen, tar sands, distillation residues from mineral oil processing, and/or oil shale.

21. The method according to claim 1, wherein the organic waste material comprises heavy oils, asphalts, bitumen, tar sands, distillation residues from mineral oil processing, oil shale, or combinations thereof, and the biogenic material comprises cellulose, starch, sugar, straw, miscanthus, corn, green waste, wood, proteins, sewage sludge, harbor slick, meat meal, bone meal, paper, carton, food residues, leather, or combinations thereof.

* * * * *